(12) United States Patent
Mudigonda et al.

(10) Patent No.: US 7,783,312 B2
(45) Date of Patent: Aug. 24, 2010

(54) DATA THROUGHPUT IMPROVEMENT IN IS2000 NETWORKS VIA EFFECTIVE F-SCH REDUCED ACTIVE SET PILOT SWITCHING

(75) Inventors: Ravishanker Mudigonda, San Diego, CA (US); Syed Nadeem Ahsan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 890 days.

(21) Appl. No.: 10/349,764

(22) Filed: Jan. 23, 2003

(65) Prior Publication Data

US 2004/0176090 A1    Sep. 9, 2004

(51) Int. Cl.
    *H04B 7/00* (2006.01)
(52) U.S. Cl. ............ 455/513; 455/522; 455/63.1; 455/67.11; 455/67.13; 455/67.16; 455/68; 455/69; 455/115.1; 455/115.3; 455/226.1; 455/226.2; 455/434
(58) Field of Classification Search ............... 455/513, 455/522, 63.1, 67.11, 67.13, 67.16, 68, 69, 455/115.1, 115.3, 226.1, 226.2, 437, 434
    See application file for complete search history.

(56) References Cited

U.S. PATENT DOCUMENTS

| | | | |
|---|---|---|---|
| 5,987,326 | A | 11/1999 | Tiedemann, Jr. et al. |
| 6,078,817 | A * | 6/2000 | Rahman .............. 455/452.1 |
| 6,377,809 | B1 | 4/2002 | Rezaiifar et al. |
| 6,754,191 | B1 | 6/2004 | Paranchych et al. |
| 6,956,837 | B1 * | 10/2005 | Lee ..................... 370/331 |
| 7,058,035 | B2 | 6/2006 | English |
| 7,239,847 | B2 | 7/2007 | Attar et al. |
| 2001/0038616 | A1 * | 11/2001 | Fong et al. ............ 370/329 |

(Continued)

FOREIGN PATENT DOCUMENTS

CA        2414229        12/2001

(Continued)

OTHER PUBLICATIONS

International Preliminary Examination Report-PCT/US04/001883, IPEA/US-Sep. 29, 2004.

(Continued)

*Primary Examiner*—Patrick N Edouard
*Assistant Examiner*—Justin Y Lee
(74) *Attorney, Agent, or Firm*—Sayed H. Beladi; Kristine U. Ekwueme (57) ABSTRACT

Systems and methods for improving the performance of wireless telecommunications networks by reducing data communications between a mobile station and a base station. One embodiment of the invention is implemented in an IS2000 (cdma2000) network. This network communicates data from a base station to a mobile station over a supplemental forward channel. In order to maintain the best communication channel for data transmissions, the mobile station monitors the signals received from an active set of base stations and identifies the strongest signal of a reduced active set so that the corresponding base station can be selected for data communications. Upon the occurrence of conditions indicating that a new base station within the reduced active set should be selected, the mobile station provides a notification to the base stations in the reduced active set so that further data transmissions will be made by the newly selected base station.

36 Claims, 6 Drawing Sheets

U.S. PATENT DOCUMENTS

2003/0083069 A1* 5/2003 Vadgama .................... 455/436
2004/0110524 A1* 6/2004 Takano et al. ............... 455/522
2004/0196861 A1* 10/2004 Rinchiuso et al. ........... 370/441

FOREIGN PATENT DOCUMENTS

| JP | 2002-10313 | 1/2002 |
|----|------------|--------|
| WO | 0021214 | 4/2000 |
| WO | 0103387 | 5/2001 |
| WO | 0207366 | 1/2002 |
| WO | 03021984 | 3/2003 |

OTHER PUBLICATIONS

International Search Report-PCT/US04/001883, International Search Authority-European Patent Office-Jul. 6, 2004.

Written Opinion-PCT/US04/001883, International Search Authority-European Patent Office-Jul. 6, 2004.

* cited by examiner

DATA THROUGHPUT IMPROVEMENT IN IS2000 NETWORKS VIA EFFECTIVE F-SCH REDUCED ACTIVE SET PILOT SWITCHING

BACKGROUND

The invention relates generally to the field of telecommunications, and more particularly to systems and methods for improving the performance of data transmissions in wireless telecommunications systems.

In a typical wireless voice/data communications system, there are multiple base stations and multiple mobile stations. Each of the base stations has an associated area of coverage. This area is referred to as a sector. When a mobile station is in a base station's sector, the mobile station can communicate with the base station.

The base stations in a wireless telecommunications system are generally positioned so that each base station is associated with a different area of coverage. This is because it generally is not necessary for a mobile station to be able to communicate with more than a single base station. Nevertheless, the sectors associated with the different base stations in the system typically overlap to some extent in order to ensure adequate coverage of the entire area served by the system. Thus, as a mobile station moves throughout the service area (which typically includes many different sectors), it may be in communication with a single base station, or multiple base stations at any given time.

In one type of wireless communication system, both voice and data communications are enabled, although not simultaneously. When voice call is in progress, the voice data is communicated over a "fundamental" channel. The fundamental channel is used both for voice data and for system signaling messages. This is possible because voice data does not use all of the fundamental channel bandwidth. The fundamental channel is established between the mobile station and a set of base stations known as the active set. The same voice data is transmitted to the mobile station by all of the base stations in the active set. The mobile station uses a weighting algorithm based on the signal strengths (the strongest signals are weighted more heavily) to combine the signals. Because of the nature of the voice communications, the transmission of the redundant data does not impair the performance of the system.

When data communications are in progress, the data is carried over the fundamental channel, which is used both to communicate the data and to communicate system signaling messages. When the amount of data being communicated is large, the base station can set up a supplemental channel to carry additional data and to thereby increase the throughput. The supplemental channel cannot carry system signaling messages.

High-speed data communications are somewhat different than voice communications. Because high-speed data communications have more overhead associated with them, and because they use more power then voice communications, the transmission of redundant data from the base stations to the mobile station may degrade the performance and reduce the capacity of the system (the number of users that can be serviced by the respective base stations). This is, in part, the result of the increased interference that results from the transmission of the redundant data.

Because it is desirable to reduce the interference and resource usage associated with redundant data transmissions, the supplemental channel over which these transmissions are carried is not always on. Data transmissions on the supplemental channel are typically assigned a duration (from 20 milliseconds to 5.12 seconds in an IS2000 system). If this duration expires with no data to be transmitted, the supplemental channel is essentially turned off (i.e., signaling will be required to assign a new duration for transmission of further data). This is in contrast to the fundamental channel, over which at least a minimal amount of dummy data is transmitted at all times. Even though the supplemental channel is not always on, however, prior art systems still do not operate efficiently in terms of their usage of resources and generation of interference. It would therefore be desirable to improve these aspects of existing systems.

SUMMARY OF THE INVENTION

One or more of the problems outlined above may be solved by the various embodiments of the invention. Broadly speaking, the invention comprises systems and methods for improving forward link data throughput in wireless telecommunications networks by transmitting high-speed data to a mobile station through a reduced active set of base stations, and by providing efficient mechanisms for switching base stations to maintain high relative signal strengths.

In one embodiment of the invention, a mobile station is configured to receive data communications from one or more base stations in a reduced active set of base stations to monitor forward supplemental channel signal strengths from the active set of base stations, and to trigger changes to the reduced active set of base stations based upon the monitored signal strengths. The mobile station and base stations are components of an IS2000 network. The mobile station is configured to monitor the strengths of pilot signals for an active set of base stations and to determine whether conditions based upon the rank of base stations' signal strengths indicate that the mobile station should transmit a message to the base stations initiating a change in the reduced active set of base stations.

One embodiment of the invention comprises a method for improving the throughput of high-speed data communications over a forward link supplemental channel by monitoring the strength of pilot signals from an active set of base stations, detecting sets of conditions that indicate changes in a reduced active set of base stations should be initiated, and transmitting messages to the base stations initiating such changes. The sets of conditions indicative of a need to change base stations in the reduced active set may include the dropping of a strongest pilot signal's strength below a threshold level, reduced active set signal strengths dropping in rank, and reduced active set signal strengths being less than those of base stations in the active set. The detected conditions may be filtered by requiring that the changes in signal strength and/or rank persist for a predetermined length of time, or that differences in signal strength be greater than a threshold amount before triggering the transmission of notification messages to the base stations.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION OF A PREFERRED EMBODIMENT

One or more embodiments of the invention are described below. It should be noted that this and any other embodiments described below are exemplary and are intended to be illustrative of the invention rather than limiting.

As described herein, various embodiments of the invention comprise systems and methods for improving the performance of wireless telecommunications networks by reducing data communications between a mobile station and a base station. One embodiment of the invention is implemented in an IS2000 (cdma2000) network, according to IS2000.5"Upper Layer (layer 3) Signaling Standard for cdma2000 Spread Spectrum Systems". This network communicates data from a base station to a mobile station over a supplemental forward channel. In order to maintain the best communication channel for data transmissions, the mobile station monitors the signals received from a reduced active set of base stations and identifies the strongest signal so that the corresponding base station can be selected for data communications. (In one embodiment, the reduced active set is the set of base stations from which the mobile station receives high-speed data communications.) Upon the occurrence of conditions indicating that a new base station within the reduced active set should be selected, the mobile station provides a notification to the base stations in the reduced active set so that further data transmissions will be made by the newly selected base station(s).

While some existing systems provide mechanisms for switching data transmissions from one base station to another, these mechanisms typically are somewhat inefficient because, for example, they require periodic messages to/from all of the base stations with which the mobile station is in communication, thereby wasting valuable resources and creating unnecessary interference, both of which can reduce system throughput. The present systems and methods, the other hand, reduce the number of messages to the base stations by only communicating these messages to and from the reduced active set, and by only communicating these messages upon the occurrence of conditions that indicate a new base station should be selected for data transmissions. By reducing the number of messages that are needed to implement switching between base stations, in accordance with various aspects of the invention, the systems and methods reduce overhead, conserve resources and eliminate unnecessary interference. As a result, the throughput of the system may be improved.

Various embodiments of the invention may be implemented in an IS2000 network. IS2000 is a third generation wireless data communications standard that evolved from the second generation IS95 standard. IS2000 networks are designed to carry both voice and data communications between base stations and mobile stations in the system.

Figure 1:
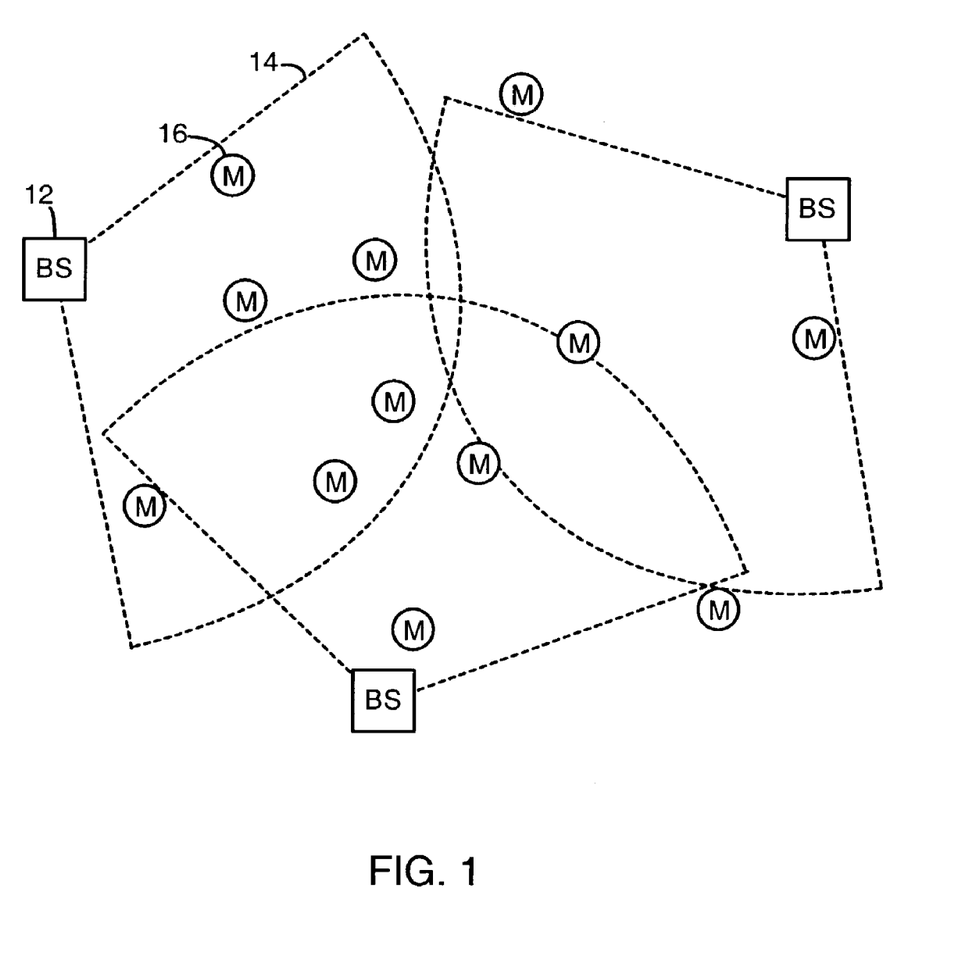
FIG. 1 is a diagram illustrating a plurality of base stations and a plurality of mobile stations in a wireless telecommunications network in accordance with one embodiment.

Referring to FIG. 1, a diagram illustrating a plurality of base stations and a plurality of mobile stations in a wireless telecommunications network in accordance with one embodiment is shown. FIG. 1 depicts three of the base stations 12 in the system. Each base station 12 has an associated sector 14, which is a coverage area wherein mobile stations in the area can communicate with the base station. (While the sectors in the figure are distinctly delineated by dotted lines, the boundaries of the sectors may be, in actuality, more graduated.) A number of mobile stations 16 are scattered throughout the coverage area of the combined sectors.

It should be noted that, for purposes of clarity, only one of the base stations, sectors, and mobile stations in the figure is identified by the corresponding reference number. Where each of these elements of the network is referred to herein by the corresponding reference number, the reference is applicable to any of the identical elements.

Figure 2:
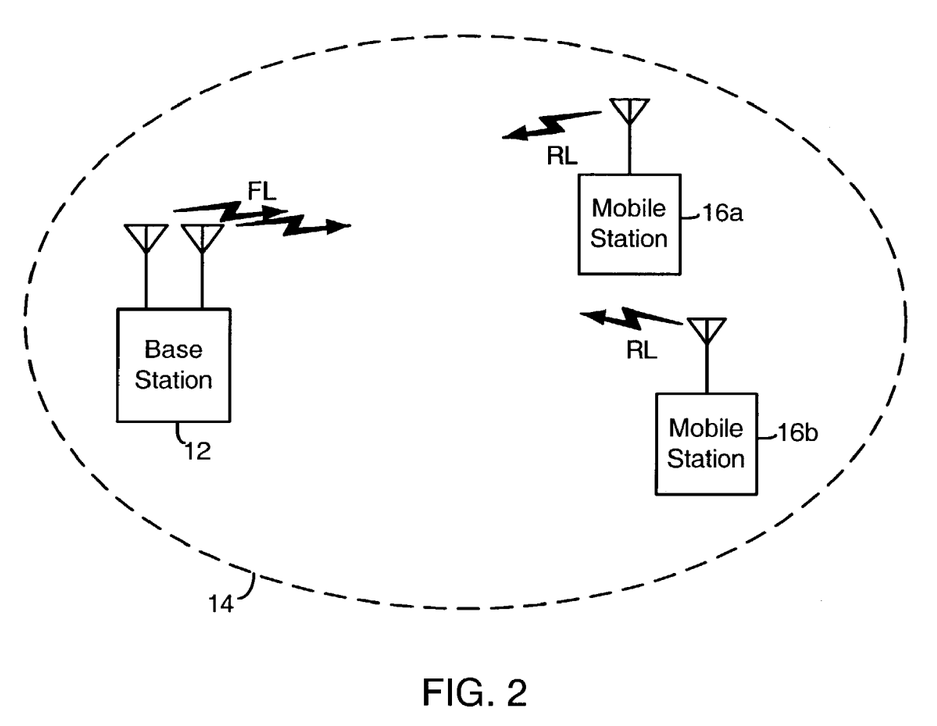
FIG. 2 is a diagram illustrating a single base station which is in communication with multiple mobile stations within its sector in accordance with one embodiment.

Referring to FIG. 2, a diagram illustrating a single base station 12 which is in communication with multiple mobile stations 16 within its sector 14 is shown. Data is communicated from base station 12 to mobile stations 16 over a forward link (FL). Data is communicated from each of the mobile stations 16 to base station 12 over reverse links (RL) from the respective mobile stations 16. Communications may be carried on between a single base station 12 and multiple mobile stations 16 at any given time.

Figure 3:
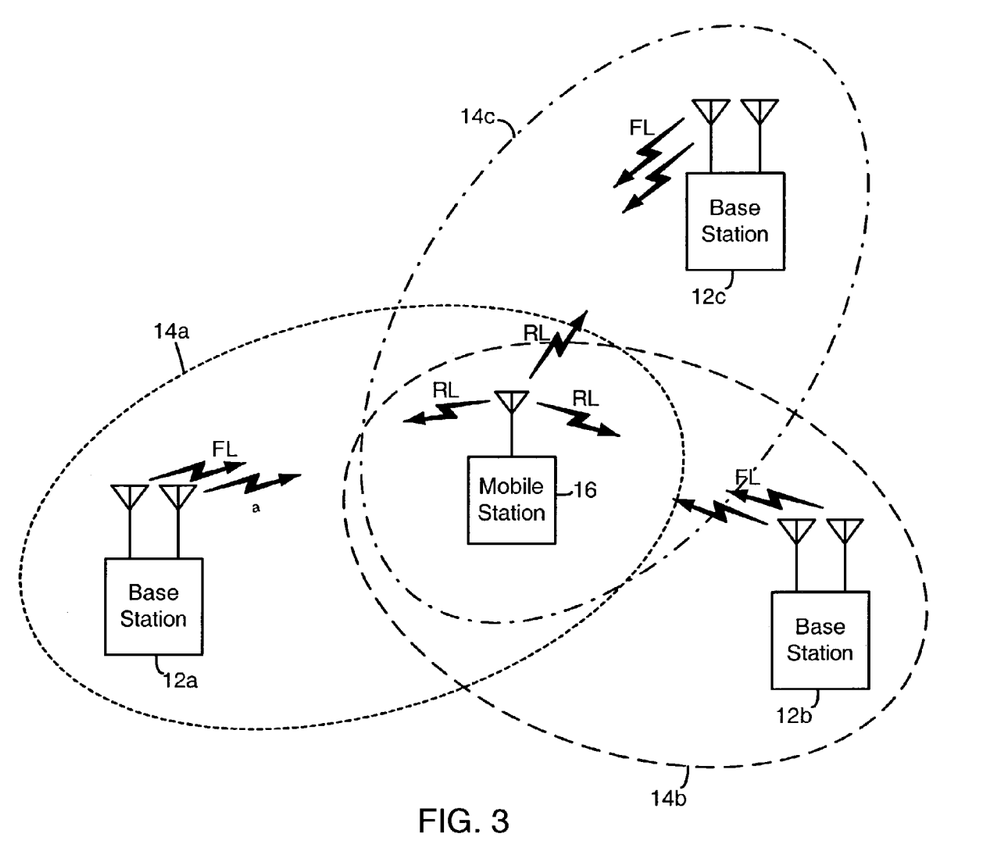
FIG. 3 is a diagram illustrating a single mobile station which is in communication with three base stations in accordance with one embodiment.

Referring to FIG. 3, a diagram illustrating a single mobile station 16 which is in communication with three base stations 12 is shown. In this instance, mobile station 16 is in a position which lies within the sector 14 corresponding to each of the base stations 12. The set of base stations 12 with which mobile station 16 can communicate are referred to as the "active set" of base stations. Data is communicated from each of the base stations 12 in the active set to mobile station 16 over the forward link of the respective base station 12, while data is communicated from mobile station 16 to each of the base stations 12 via a corresponding reverse link.

Mobile station 16 is depicted in FIG. 3 as receiving communications via a forward link from each of the three base stations, 12a, 12b and 12c. This is representative of voice communications between mobile station 16 and base stations 12 on fundamental channels of the respective forward links. In other words, voice communications on the fundamental channels may be received simultaneously from all three base stations. Mobile station 16 typically receives voice communications from each base station 12 for which mobile station 16 is in the corresponding sector 14. Mobile station 16 selects the strongest of the redundant signals from the base stations 12 and discards the others.

In regard to high-speed data communications, however, it is impractical to communicate data to mobile station 16 from each of the base stations 12. The impracticality arises from the fact that high-speed data transmissions by a base station require a large amount of resources of the base station, have a relatively large amount of associated overhead, and also create a relatively large amount of interference. If multiple base stations redundantly transmit high-speed data to a mobile station, all but one of these base stations is unnecessarily using resources and unnecessarily generating interference that makes it more difficult to communicate in the wireless environment. It is therefore desirable to reduce the number of base stations 12 which communicate high-speed data to mobile station 16.

One of the difficulties in implementing the concept of communicating high-speed data to the mobile station from less than all of the base stations is selecting which one (or ones) of the base stations should carry these communications (these base stations comprise the reduced active set). While it is relatively straightforward to say that the base station which has the strongest signal should communicate data to the mobile station, it should be noted that the mobile station is typically moving and, as a result, the signal strength from each of the base stations may vary with time.

It is a relatively straightforward matter to measure the strength of the signal from each of the base stations, and this is currently performed in existing systems, although it is for different purposes. Each of the base stations transmits control information to the mobile stations within its sector over a pilot channel (which may be referred to herein simply as a "the pilot"). The strength of the pilot from each base station can be measured using existing mechanisms. These mechanisms are generally based upon the measurement of a signal-to-interference-and-noise ratio (SINR) for the pilot. This information can then be communicated from the mobile station to the base stations so that high-speed data communications can be switched from one base station to another.

While some prior art systems utilize similar methods of signal strength measurement and notification, they do so in a way that is not very efficient. For example, the pilot strength measurements are typically made and corresponding notifications transmitted from the mobile station to the base stations periodically, whether they are necessary or not. In these prior art systems, pilot strength measurements and notifications typically also cover the entire set of base stations with which the mobile station is in communication, even though some of these base stations may not be likely candidates for selection to transmit high-speed data to the mobile station. As a result, prior art mechanisms tend to generate a lot of unnecessary overhead communications that use up resources and create interference in the system. These mechanisms will be discussed in more detail below in contrast to the present systems and methods.

The present systems and methods, rather than requiring periodic reporting of pilot signal strengths for all of the base stations, initiate notifications to the base stations upon the occurrence of conditions indicating that it may be necessary to switch high-speed data communications from one base station to another. If the conditions indicate that no change is necessary, no notification is generated. The conditions indicative of a needed change may, for example, comprise a condition indicating that a base station's pilot strength falling below a certain threshold, a condition indicating that base stations' pilot strengths changing ranks, or a condition indicating that a certain number of erasures or discontinuous transmissions being received by the mobile station.

Figure 4:
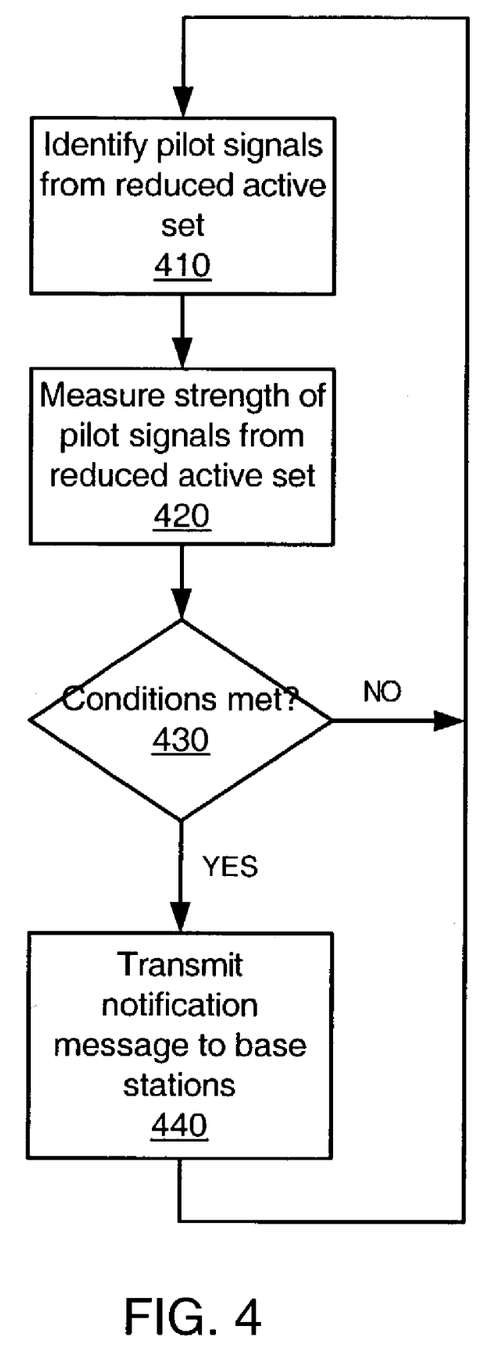
FIG. 4 is a flow diagram illustrating a method in accordance with one embodiment of the invention.

Referring to FIG. 4, a flow diagram illustrating a method in accordance with one embodiment of the invention is shown. In various embodiments, because the pilot strength measurements are performed by the mobile station, the method is implemented in the mobile station. As shown in FIG. 4, at block 410, the mobile station first identifies the pilot signals of each of the base stations in the reduced active set. The mobile station then measures the strengths of these base stations' pilot signal signals, as well as those of the base stations in the active set (at block 420). Once the strength of each pilot signal has been determined, the strengths of the pilot signals can be ranked. At block 430, based upon the rankings of the pilot signal strengths, the mobile station determines whether a notification should be sent to the base stations indicating that the high-speed data communications should be switched from one base station to another. If necessary, the appropriate notification is then sent to the base stations (at block 440).

It should be noted that a variety of conditions may be used to determine whether a notification messages should be sent to the base stations to indicate a switch for purposes of high-speed data communications. Three exemplary conditions are described below. These conditions are: currently selected base station's rank is reduced; currently selected base station's rank is not highest; and predetermined number of consecutive erasures or discontinuous transmissions are detected.

In one embodiment, the mobile station is configured to transmit a notification to the base stations if the mobile station determines that the rank, based on pilot signal strengths, of each of the base stations in the reduced active set has dropped. This can be implemented in conjunction with the determination that the strongest signal of the reduced active set's base stations has dropped below a threshold level. The effect of this latter condition is to eliminate the need to transmit a notification message if the strongest signal of the reduced active set is about a threshold level (e.g., if the signal is no lower than the threshold level, then the signal is sufficient for continued high-speed data transmissions, so it is not necessary to switch to another base station for these transmissions). This embodiment assumes that the initial rankings of the base stations in the reduced active set are optimal (e.g., they have the strongest signals of the base stations in the active set).

In another embodiment, the mobile station is configured to transmit a notification to the base stations if the signal strength of each of the base stations in the reduced active set is below a threshold level, and if the strongest signal corresponds to a base station that is not in the reduced active set. Again, if at least one of the base stations in the reduced active set has a signal strength that is above a threshold level, then it is sufficient to continue high-speed data transmissions using the reduced active set. On the other hand, if none of the reduced active set signal strengths are above the threshold level, but the strongest signal still corresponds to one of the base stations in the reduced active set, there is no need to change, so no notification message is transmitted to the base stations. This embodiment does not assume that the initial rankings of the reduced active set base stations are optimal.

In another embodiment, the mobile station is configured to transmit a notification to the base stations if a certain number of consecutive erasures or discontinued transmissions are detected on the forward link supplemental channel. While discontinued transmissions are not really errors, real errors may be misinterpreted as discontinued transmissions, so discontinued transmissions are handled here as if they were errors. Erasures and discontinued transmissions (collectively referred to herein simply as erasures) effectively amount to errors in received data, and therefore indicate that the signal strengths of the base stations in the reduced active set are inadequate. In other words, there are too many errors in the high-speed data received over the forward link supplemental channel.

It should be noted that, because the fading characteristics of the transmission paths from each of the base stations may change very rapidly, it may be desirable to implement one or more filtering conditions to eliminate unnecessary notification messages (also referred to as filtering process or filtering mechanism herein). For instance, if the reduced active set consists of one base station, and the signal strength corresponding to this base station momentarily dips below that of another base station, but immediately returns to the highest ranking, it would be pointless to transmit a notification message when the dip occurs indicating that a new base station should be used, only to send out another a moment later, indicating that the original base station should be re-selected. The conditions used by the mobile station to indicate that a notification message should be transmitted may therefore include the condition that the ranking of the signal strengths change and remain in the new order for several frames.

It may also be desirable to include a filter condition that prevents the transmission of a notification message unless, in addition to a base station's signal strength dropping below that of another, the signal strength drops below the other signal by a threshold amount. This would prevent the situation in which, while the base station that is currently transmitting high-speed data is not the strongest, the amount by which it is less than another base station's signal strength is negligible. In such a situation, switching base stations would not provide any appreciable improvement in performance.

Figure 5:
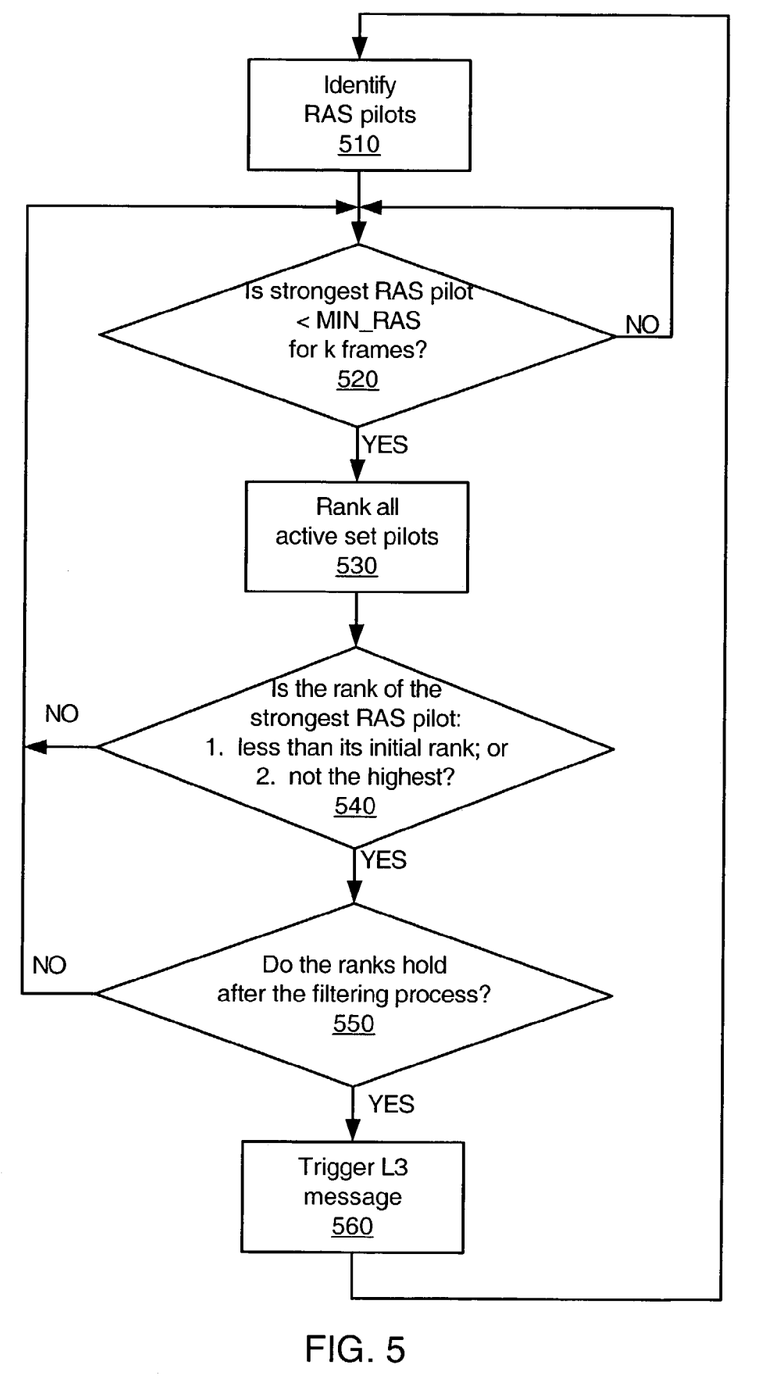
FIG. 5 is a detailed flow diagram illustrating a method in which certain signal strength conditions and filtering are implemented in accordance with one embodiment.

Referring to FIG. 5, a more detailed flow diagram illustrating a method in which the signal strength conditions and filtering described above are implemented is shown. In accordance with this figure, at block 510 the base stations in the reduced active set are first identified. The strength of the strongest signal in the reduced active set is monitored to detect a decrease. At block 520, as long as the strength of the signal remains above the threshold level (MIN_RAS), the signal strength continues to be monitored. More particularly, as long as the signal strength does not fall below the threshold level for k or more frames, the signal strength will simply be monitored.

At block 530, if the signal strength drops below the threshold level for k or more frames, all of the base stations (not only those in the reduced active set) will be ranked according to the strength of their respective pilot signals. Then, it will be determined whether one of two conditions obtain: the rank of the reduced active set base station having the strongest signal falls below its previous rank; or the rank of this base station is not the highest of all the base stations in the active set (at block 540). If neither of these conditions is met, the mobile station returns to monitoring state until the strongest signal in the reduced active set again falls below the threshold level. If either one of the conditions is met, filtering is applied and then it is determined whether the condition is still met (at block 550). (The filtering may, as described above, comprise determining whether or a signal that has fallen below another has done so by more than a threshold amount.) If the condition is still met, then a notification message is transmitted to the base stations (at block 560). In response to this message, there may be a change in the base stations that transmit high-speed data to the mobile station.

As noted above, in the event that the appropriate conditions are met, a notification message is transmitted to the base stations. Because the present mechanism is not implemented in prior art systems, there is no message currently defined for this purpose. There are, however, several options for implementing such a message. For example, a new L3 (level 3) message could be defined. This message should be defined to include pilot signal strengths for the base stations. Optionally, the message may include other information, such as the number of erasures that have been detected in the transmission of the high-speed data. One of the potential problems with introducing this new message, however, is that it may be necessary to modify different layers of the standard in order to incorporate than a message.

Alternatively, modifications may be made to a currently defined message, such as the PSMM (pilot strength measurement message) or the PMRM (power measurement report message). Each of these message types includes a field for pilot signal strengths. Modification of one of these message types would necessitate only mobile station procedure modifications, rather than multiple layers of the standard. In choosing between these two messages, PMRM may be a better choice because most of the base stations trigger UHDMs (universal handoff direction messages) when they receive PSMMs, but ESCAMs (extended supplemental channel assignment messages) are preferred for forward link supplemental channel assignment (selection of the appropriate base station for high-speed data transmissions).

Figure 6:
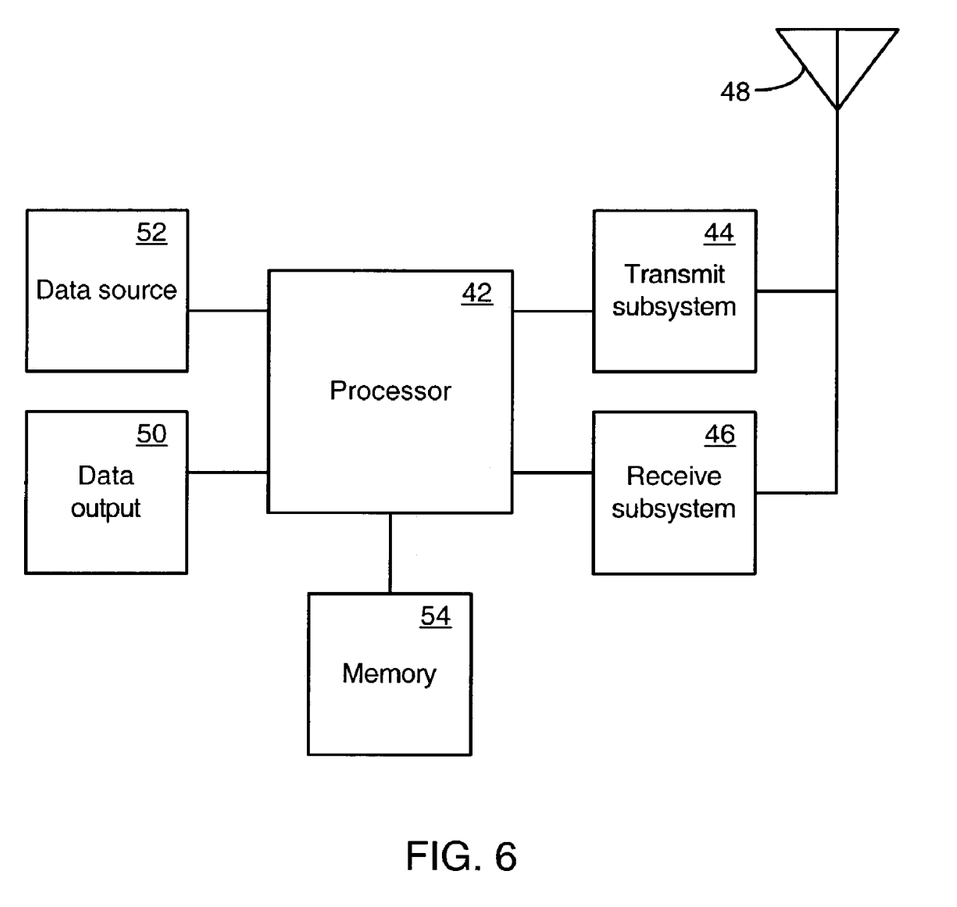
FIG. 6 is a functional block diagram illustrating the structure of a mobile station in accordance with one embodiment.

As explained above, the monitoring of signal strengths and detecting of conditions that trigger notification messages to initiate changes in the reduced active set is performed in the mobile station. Referring to FIG. 6, a functional block diagram illustrating the structure of a mobile station in one embodiment is shown. In this embodiment, the mobile station comprises a processor 42 (also called control subsystem herein) coupled to a transmit subsystem 44 and a receive subsystem 46. Memory 54 is coupled to processor 42 for storage of data used by the processor. Transmit subsystem 44 and receive subsystem 46 are coupled to shared antenna 48. Processor 42 receives data from receive subsystem 46, processes the data, and outputs the processed data via output device 50. Processor 42 also receives data from data source 52 and processes the data for transmission. The processed data is then forwarded to transmit subsystem 44 for transmission over the reverse link. In addition to processing the data from receive subsystem 46 and data source 52, processor 42 is configured to control the various subsystems of the mobile station. In various embodiments, processor 42 implements the present methods (e.g., monitoring signal strengths, ranking base stations, detecting conditions indicative of a needed change and generating appropriate notification messages, etc.).

In addition to the hardware of the mobile station, the present methods can be implemented in various combinations of software (including firmware) and hardware. The present application is therefore intended to cover software applications that include instructions for causing a computer or other data processor to perform the methods disclosed herein. These software applications may be embodied in any medium readable by such a computer or data processor, including floppy disks, CD-ROMs, DVD-ROMs, RAM, ROM, and the like. Likewise, a computer or data processor which is configured to execute such software applications, or which is otherwise programmed to perform the methods disclosed herein is intended to be covered by the present application.

As mentioned above, existing systems provide mechanisms for determining which of the base stations in the active set has the strongest signal. These mechanisms, however, are not very efficient. Some of these mechanisms will be described briefly below.

Release 0 of the IS2000 standard specifies several mechanisms that the mobile station can use to inform the base stations of pilot signal strengths. These mechanisms include: periodic PMRM; threshold based PMRM; PPSMM; and PSMM. Using the periodic PMRM (power measurement report message) mechanism, a base station can direct the mobile station (via a system parameter message, SPM) to trigger a PMRM with a certain periodicity. The PMRM identifies the pilot signal strengths of all the base stations in the active set, indexed to hdm_seq (which identifies the order of base stations in the active set and allows pilot strengths to comprise a simple list), as well as other information. This mechanism does not, however, exclusively consider forward supplemental channel reduced active set pilot signal strengths. It is not very well suited for forward supplemental channel reduced active set switching since it increases the loading on the reverse link from the mobile station.

Threshold Based PMRM provides a mechanism in which the base station can direct the mobile station (via SPM) to trigger a PMRM when certain number of bad frames are received by mobile station on the forward link fundamental channel. As indicated above, the PMRM includes pilot signal strengths for all the active set pilots indexed in reference to the latest hdm_seq and other information. This method does not consider forward supplemental channel reduced active set pilot signal strengths, and is not well suited for forward supplemental channel reduced active set switching.

A PPSMM (periodic pilot strength measurement message) can be triggered by the base station via PPMRO with a certain periodicity. This may be done irrespective of the pilot strengths, or optionally when certain thresholds are met. The PPSMM contains pilot strengths and various other information. This mechanism considers active set pilot strengths and is a good candidate for assigning the strongest pilot to new forward supplemental channel burst assignment but not an optimal solution to switch base stations in the reduced active set during an ongoing burst since it does consider other active set pilots along with forward supplemental channel reduced active set pilot signal strengths.

A PSMM (periodic pilot strength measurement message) can be used to report the pilot strengths of the current active set pilots and the potential pilots to be added to or dropped from the current active set. The PSMM can be triggered based on various thresholds. This mechanism does consider forward supplemental channel reduced active set pilot signal strengths along with other active set pilots, but it does not provide a fast and effective feedback since forward supplemental channel reduced active set switching is more meaningful prior to T_DROP (which drops a base station from the active set). Further, delays due to the T_DROP threshold value and the T_TDROP timer compared to allowed forward supplemental channel burst durations might be unacceptable.

Release A of the IS2000 standard specifies several additional mechanisms, including: order based PSMMM; periodic PSMMM; and threshold based PSMMM. Using the order based PSMMM mechanism, the base station can direct the mobile station (via MABOPM) to trigger a PSMMM when the order of the last reported pilot strength measurements change during an ongoing forward supplemental channel burst. The PSMMM contains pilot signal strength and the rank of the pilot signal being reported, indexed in reference to the latest SMM.

Using the periodic PSMMM mechanism, the base station can direct the mobile station (via MABOPM) to trigger a PSMMM with certain periodicity during on ongoing forward supplemental channel burst. The PSMMM contains pilot strength and rank of the pilot being reported indexed in reference to the latest PSMM.

Using the threshold based PSMMM mechanism, the base station can direct the mobile station (via MABOPM) to trigger a PSMMM whenever a measured pilot crosses below a lower bound or exceeds an upper bound during on ongoing forward supplemental channel burst. The PSMMM contains pilot strength and rank of the pilot being reported indexed in reference to the latest PSMM.

The PSMMM-related mechanisms can be used for forward supplemental channel reduced active set switching, but do not provide an optimal solution since they consider all the active set pilots and do not identify reduced active set pilot signals. Furthermore, the PSMMMs can carry information for only one base station per message and require 5 millisecond frame support.

Thus, it is evident that the mechanisms available in the prior art do not provide efficient means for monitoring signal strengths and initiating switching of the base stations used for high-speed data transmissions. The inefficiency these mechanisms results, for example, from the fact that they are initiated by the base stations, they are performed when there is no need to initiate a switch, and they typically involve more information than is necessary. Consequently, they produce a heavier load on the reverse link and generate unnecessary interference that reduces forward link throughput. The various embodiments of the present systems and methods may be implemented in the mobile station rather than the base station and may substantially reduce the number of notifications and the amount of transmitted data and resulting interference.

The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for communications of high speed data in a communication system, comprising:

determining an active set of base stations by monitoring signal strength of signals received from a number of base stations for communications of essentially voice data over a fundamental channel;

ranking the base stations of the active set by signal strength;

determining at a mobile station a reduced active set of base stations based on the rank of members of said active set of base stations for communications of high speed data over a supplemental channel;

detecting a predetermined set of conditions based on the monitored signal strength, wherein the predetermined set of conditions comprises a condition indicating that a base station currently selected for transmission of said supplemental channel has a rank other than first, in order of greatest signal strength;

changing ranking of members of said reduced active set of base stations in response to detecting the predetermined set of conditions; and wherein determining the reduced active set further comprises:
selecting base stations from the active set configured to carrying the communications of the high speed data over the supplemental channel;
defining the selected base stations as the reduced active set of base stations; and
transmitting a notification only to the reduced active set of base stations based on detecting the predetermined set of conditions, wherein the notification indicates to switch the communications of the high speed data from one base station to another base station.

2. The method of claim 1, wherein the predetermined set of conditions comprises a condition indicating that a base station currently selected for transmission of said supplemental channel is dropping in rank.

3. The method of claim 1, wherein the predetermined set of conditions comprises a condition indicating that a predetermined number of consecutive erasures has been detected in reception of said supplemental channel.

4. The method of claim I, wherein detecting the predetermined set of conditions based on the monitored signal strength further comprises:
filtering detected changes in signal strength.

5. The method of claim 4, wherein filtering detected changes in signal strength comprises detecting changes that persist for a predetermined number of frames.

6. The method of claim 4, wherein filtering detected changes in signal strength comprises detecting changes that result in a change of rank between two base stations only if the signal strengths corresponding to the two base stations differ by more than a threshold amount.

7. The method of claim 1, wherein said changing in the reduced active set of base stations comprises transmitting a notification message to the base stations.

8. The method of claim 7, wherein the notification message comprises a pilot strength measurement message.

9. The method of claim 7, wherein the notification message comprises a power measurement report message.

10. The method of claim 7, wherein the notification message identifies ranks of the base stations in the reduced active set.

11. The method of claim 7, wherein the notification message identifies a base station having a strongest signal.

12. The method of claim 1, wherein the selecting further comprises selecting base stations from the active set currently carrying the communications of the high speed data.

13. A system for communications of high speed data in a communication system, comprising:
a receive sub-system configured to receive pilot signals from multiple base stations;
a transmit sub-system configured to transmit signals to multiple base stations;
a control sub-system coupled to the receive sub-system and the transmit sub-system, the control sub-system determines an active set of base stations by monitoring signal strength of signals received from a number of base stations for communications of essentially voice data over a fundamental channel, ranks the base stations of the active set by signal strength, determines at a mobile station a reduced active set of base stations based on the rank of members of said active set of base stations for communications of high speed data over a supplemental channel, detects a predetermined set of conditions based on the monitored signal strength, wherein the predetermined set of conditions comprises a condition indicating that a base station currently selected for transmission of said supplemental channel has a rank other than first, in order of greatest signal strength, and changes ranking of members of said reduced active set of base stations in response to detecting the predetermined set of conditions; and wherein the control sub-system further:
selects base stations from the active set configured to carrying the communications of the high speed data over the supplemental channel;
defines the selected base stations as the reduced active set of base stations, and
transmits a notification only to the reduced active set of base stations based on detecting the predetermined set of conditions, wherein the notification indicates to switch the communications of the high speed data from one base station to another base station.

14. The system of claim 13, wherein the predetermined set of conditions comprises a condition indicating that a base station currently selected for transmission of said supplemental channel is dropping in rank.

15. The system of claim 13, wherein the predetermined set of conditions comprises a condition indicating that a predetermined number of consecutive erasures has been detected in reception of said supplemental channel.

16. The system of claim 13, wherein the system is configured to filter detected changes in signal strength.

17. The system of claim 16, wherein the system is configured to filter detected changes in signal strength by detecting changes that persist for a predetermined number of frames.

18. The system of claim 16, wherein the system is configured to filter detected changes in signal strength by detecting changes that result in a change of rank between two base stations only if the signal strengths corresponding to the two base stations differ by more than a threshold amount.

19. The system of claim 13, wherein the system is configured to initiate the change of base stations for high-speed data communications by transmitting a notification message to the base stations.

20. The system of claim 19, wherein the notification message comprises a pilot strength measurement message.

21. The system of claim 19, wherein the notification message comprises a power measurement report message.

22. The system of claim 19, wherein the notification message identifies ranks of the base stations in the reduced active set.

23. The system of claim 19, wherein the notification message identifies a base station having a strongest signal.

24. The system of claim 13, wherein the control sub-system selects base stations from the active set currently carrying the communications of the high speed data.

25. A computer readable medium encoded with computer executable instructions for communications of high speed data in a communication system, the instructions comprising:
determining an active set of base stations by monitoring signal strength of signals received from a number of base stations for communications of essentially voice data over a fundamental channel;
ranking the base stations of the active set by signal strength;
determining at a mobile station a reduced active set of base stations based on the rank of members of said active set of base stations for communications of high speed data over a supplemental channel;

detecting a predetermined set of conditions based on the monitored signal strength, wherein the predetermined set of conditions comprises a condition indicating that a base station currently selected for transmission of said supplemental channel has a rank other than first, in order of greatest signal strength;

changing ranking of members of said reduced active set of base stations in response to detecting the predetermined set of conditions; and wherein the instructions for determining the reduced active set further comprise:

selecting base stations from the active set configured to carrying the communications of the high speed data over the supplemental channel;

defining the selected base stations as the reduced active set of base stations: and transmitting a notification only to the reduced active set of base stations based on detecting the predetermined set of conditions. wherein the notification indicates to switch the communications of the high speed data from one base station to another base station.

26. The computer readable medium of claim 25, wherein the predetermined set of conditions comprises a condition indicating that a base station currently selected for transmission of said supplemental channel is dropping in rank.

27. The computer readable medium of claim 25, wherein the predetermined set of conditions comprises a condition indicating that a predetermined number of consecutive erasures has been detected in reception of said supplemental channel.

28. The computer readable medium of claim 25, wherein the instructions for selecting further comprise selecting base stations from the active set currently carrying the communications of the high speed data.

29. The computer readable medium of claim 25, wherein detecting the predetermined set of conditions based on the monitored signal strength further comprises filtering detected changes in signal strength that persist for a predetermined number of frames.

30. The computer readable medium of claim 29, wherein filtering detected changes in signal strength comprises detecting changes that result in a change of rank between two base stations only if the signal strengths corresponding to the two base stations differ by more than a threshold amount.

31. A system for communications of high speed data in a communication system, comprising:

means for determining an active set of base stations by monitoring signal strength of signals received from a number of base stations for communications of essentially voice data over a fundamental channel;

means for ranking the base stations of the active set by signal strength;

means for determining at a mobile station a reduced active set of base stations based on the rank of members of said active set of base stations for communications of high speed data over a supplemental channel;

means for detecting a predetermined set of conditions based on the monitored signal strength, wherein the predetermined set of conditions comprises a condition indicating that a base station currently selected for transmission of said supplemental channel has a rank other than first, in order of greatest signal strength;

means for changing ranking of members of said reduced active set of base stations in response to detecting the predetermined set of conditions; and wherein the means for determining the reduced active set further comprises:

means for selecting base stations from the active set configured to carrying the communications of the high speed data over the supplemental channel;

means for defining the selected base stations as the reduced active set of base stations; and means for transmitting a notification only to the reduced active set of base stations based on detecting the predetermined set of conditions, wherein the notification indicates to switch the communications of the high speed data from one base station to another base station.

32. The system of claim 31, wherein the predetermined set of conditions comprises a condition indicating that a base station currently selected for transmission of said supplemental channel is dropping in rank.

33. The system of claim 31, wherein the predetermined set of conditions comprises a condition indicating that a predetermined number of consecutive erasures has been detected in reception of said supplemental channel.

34. The system of claim 31, wherein the means for selecting further comprises selecting base stations from the active set currently carrying the communications of the high speed data.

35. The system of claim 31, wherein the means for detecting the predetermined set of conditions based on the monitored signal strength further comprises means for filtering detected changes in signal strength that persist for a predetermined number of frames.

36. The system of claim 35, wherein the means for filtering detected changes in signal strength comprises means for detecting changes that result in a change of rank between two base stations only if the signal strengths corresponding to the two base stations differ by more than a threshold amount.

* * * * *